United States Patent [19]

Watanabe et al.

[11] 3,932,778

[45] Jan. 13, 1976

[54] COOLING DEVICE FOR AN ELECTRIC ROTARY MACHINE

[75] Inventors: Masatoshi Watanabe; Noriyoshi Takahashi; Ichiro Nagata, all of Hitachi, Japan

[73] Assignee: Hitachi, Ltd., Japan

[22] Filed: Apr. 9, 1974

[21] Appl. No.: 459,341

[30] Foreign Application Priority Data
Apr. 9, 1973  Japan.............................. 48-39561

[52] U.S. Cl. ................................................. 310/61
[51] Int. Cl.² ......................................... H02K 1/32
[58] Field of Search ............ 310/51, 55, 56, 58, 59, 310/60, 61, 62, 63, 64, 269, 57, 53

[56] References Cited
UNITED STATES PATENTS

| | | | |
|---|---|---|---|
| 2,381,296 | 8/1945 | Lynn | 310/63 |
| 2,707,244 | 4/1955 | Kilgore | 310/60 |
| 3,064,152 | 11/1961 | DePaul | 310/60 |
| 3,435,263 | 3/1969 | Willyoung | 310/61 |
| 3,439,202 | 4/1969 | Wanke | 310/61 |
| 3,588,557 | 6/1971 | Kilgore | 310/269 |
| 3,716,732 | 2/1973 | Tillma | 310/61 |
| 3,731,865 | 5/1973 | Wood | 310/54 |
| 3,733,501 | 5/1973 | Heller | 310/54 |
| 3,809,934 | 5/1974 | Baer | 310/53 |

*Primary Examiner*—R. Skudy
*Attorney, Agent, or Firm*—Craig & Antonelli

[57] ABSTRACT

A plurality of salient poles and a stator are adapted to be cooled only by cooling gas which is passed through a plurality of fluid passageways formed in a yoke of a rotor. By the arrangement that all the cooling gas discharged through the fluid passageways is used for cooling the rotor and the stator, cooling efficiency can be increased due to enhanced flow characteristics of the cooling gas.

8 Claims, 7 Drawing Figures

COOLING DEVICE FOR AN ELECTRIC ROTARY MACHINE

BACKGROUND OF THE INVENTION

This invention relates to improvements in or relating to cooling devices for electric rotary machines, and more particularly it is concerned with a cooling device for an electric rotary machine of the type including a water-wheel generator which has salient poles.

As is well known, an electric rotary machine of the salient-pole type popularly used nowadays in formed with a yoke rotating with the rotary shaft and having a plurality of salient poles affixed to its outer periphery and varying in number depending on the number of poles. Generally, the salient poles rotate within the stator.

It is not too much to say that the output power of an electric rotary machine may generally vary depending on the maximum temperature at heat generating sections of the machine, particularly the portions of the stator and rotor in which coils are disposed. Thus, an electric rotary machine of the aforementioned type is provided with a cooling device therefor.

In an electric rotary machine of the type described, heat is usually generated in field coils wound on the salient poles and stator coils. It is usual practice to cause a stream of cooling gas to move through the portions in which these coils are disposed to effect cooling.

It may seem easy to cause streams of cooling gas to move through heat generating portions, but the problem involved is not so simple as it seems. If the heat generating portion were disposed in the center of a large space, it would be easy to select as desired the volume of gas used and the directions in which the streams of gas are directed. What is important is to effect cooling with the highest degree of efficiency by utilizing a small space and a limited paths for the movement of the streams of cooling gas. Thus, cooling of an electric rotary machine of the type described poses a problem difficult to obviate in actual practice.

An example of the cooling device now in use which is considered to operate with the highest degree of efficiency with a machine of the medium capacity will be described first of all. Such cooling device is provided with a radial fan mounted at each axial end of the yoke of the rotor for supplying a stream of cooling gas used to cool the coils of the stator. On the other hand, coils wound on the poles of the rotor are cooled either by streams of gas discharged through gas passageways disposed between the poles and formed in the yoke or by a portion of the streams of gas produced by each fan which is caused to move axially between the adjacent poles.

The coils of the rotor and the stator can be cooled sufficiently to enable the machine to operate without failure by the aforementioned arrangement if the electric rotary machine is of a small or medium capacity. If the machine is 500 MVA or a greater capacity which has come to be used widely in recent years, however, the amount of heat generated in the machine increases and the volume of cooling gas required increases in proportion to the increase in the capacity of the machine.

It is not easy to increase the volume of cooling because the space employed for cooling must be increased. An increase in the capacity of an electric machine does not necessarily entail an increase in the space available for effecting cooling. Besides, an increase in the volume of cooling gas causes the production of a windage loss and a noise, which is not desirable in increasing the capacity of an electric rotary machine.

Cooling of the stator coils (coil ends) can be effected relatively easily beacuse they are disposed in a relatively large space. If a sufficiently large volume of gas to cool the coils wound on the poles is caused to flow between the adjacent poles, it will be possible to cool the poles but there will be an increase in the overall volume of gas used, thereby causing the production of an windage loss or a noise as aforementioned.

SUMMARY OF THE INVENTION

The present invention, which has been made in view of the aforementioned disadvantages of the prior art, has succeeded in obviating them once and for all and provides an ideal cooling device.

Accordingly, the invention has as its object the provision of a cooling device for an electric rotary machine which is capable of accomplishing the object of cooling the machine with a high degree of efficiency so as to permit the output power of the machine to be increased, without increasing the overall volume of cooling gas employed and without rendering the construction of the machine complex.

The outstanding characteristics of the invention which enable an electric rotary machine to be cooled with a high degree of efficiency are that an end of the inner peripheral surface of each end cover enclosing a coil end of the stator is disposed nearer to an end surface of the yoke than heretofore, and that cooling of the stator is effected by streams of cooling gas discharged through gas passageways formed in the yoke after such streams of gas have cooled the poles.

DESCRIPTION OF A PREFERRED EMBODIMENT

The invention will now be described in detail with reference to an embodiment thereof.

Figure 1:
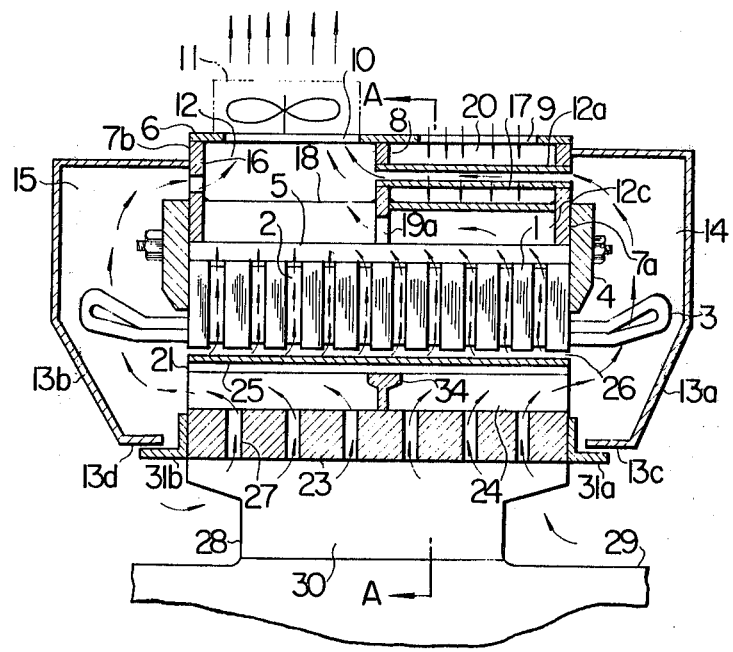
FIG. 1 is a vertical sectional side view of an electric rotary machine provided with a cooling device according to the present invention.
Figure 2:
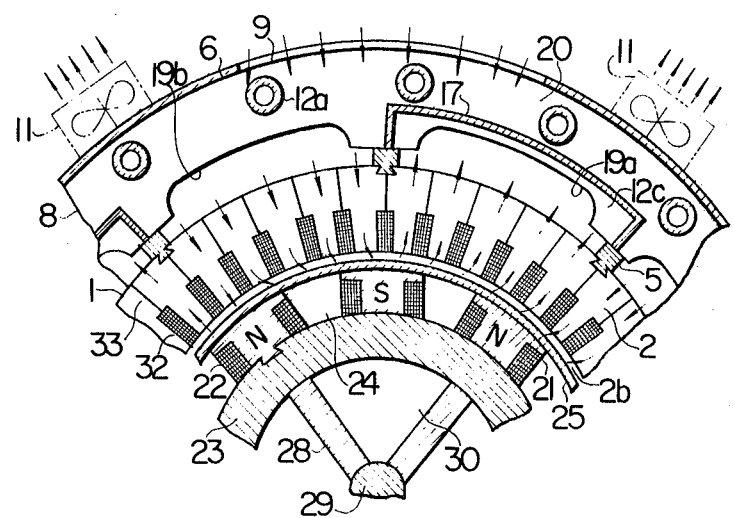
FIG. 2 is a sectional view taken along the line A—A of FIG. 1.
Figure 3:
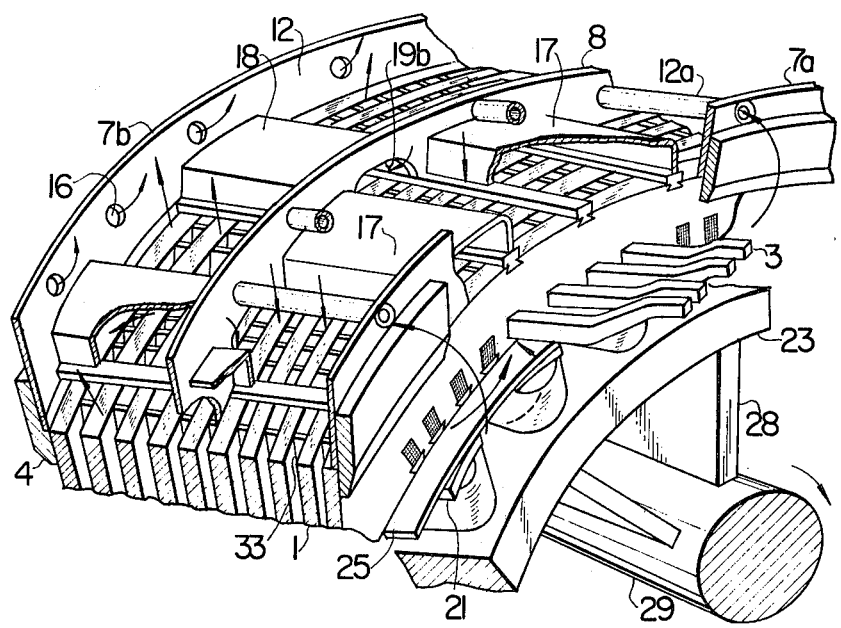
FIG. 3 is a fragmentary perspective view, with certain parts being cut away, of the electric rotary machine shown in FIG. 1.

In FIG. 1 to FIG. 3, 1 designates stator iron cores formed therein with a plurality of axially arranged fluid passage ducts 2. The stator cores 1 have stator coils built therein which include coil ends 3. 4 designates end plates for axially clamping the stator cores 1 and holding the same in place. 5 designates core keys which support and radially hold in place the stator iron cores 1 affixed to main plates 7a, 7b of a housing 6 and a partition wall 8.

The housing 6 is formed at its upper wall with ventialtion windows 9 and ventilation windows 10, with blowers 11 being mounted at the outside of the latter.

The blowers 11 perform the function of reducing, below atmospheric pressure, the pressure in an exhaust chamber 12 defined between the partition wall 8 and the main plate 7b of the housing 6 when the machine is in operation.

12a designates a plurality of fluid passage tubes maintaining communication between a pressure chamber 14 defined between the main plate 7a and an end cover 13a and the exhaust chamber 12. A pressure chamber 15 disposed oppositely to the pressure chamber 14 and defined between another end cover 13b and the main plate 7b is maintained in communication with the exhaust chamber 12 through a plurality of fluid passage openings 16 formed in the main plate 7b.

17 designates fluid collecting duct walls each mounted, as can be clearly seen in FIG. 2, between the peripherally adjacent core keys 5 so as to maintain a fluid inlet chamber 20 and a fluid collected chamber 12c airtight.

Communication is maintained between the exhaust chamber 12 and the fluid collecting chamber 12c through fluid passage grooves 19a formed in the partition wall 8. Fluid collecting duct walls 18 arranged in staggered relationship with respect to the fluid collecting duct walls 17 periphery of the machine are each disposed between the peripherally adjacent core keys 5 as can be clearly seen in FIG. 3. The interior of each fluid collecting duct wall 18 is maintained in communication with the fluid inlet chamber 20 through fluid passage grooves 19b formed in the partition wall 8.

On the other hand, 21 designates salient poles disposed on the rotor side. As shown in FIG. 2, a field coil 22 is wound on each salient pole 21, and salient poles 21 are arranged peripherally of the machine alternately to constitute north and south poles. The salient poles 21 are affixed to a yoke 23, and axially arranged ducts 24 are each formed between the peripherally adjacent salient poles 21.

A cylindrical member 25 mounted on the outer periphery of each salient pole 21 is effective to maintain the ducts 24 and a space 26 between the rotor and stator airtight. It is preferred that the cylindrical member 25 be employed to maintain the ducts 24 and space 26 airtight as described with reference to the embodiment shown and described herein. However, if difficulty is experienced in fabricating a cylindrical member of the type described which can withstand high centrifugal forces exerted thereon, an opening of each duct 24 on the side of the space 26 may be closed by a suitable sealing member.

27 designates a plurality of fluid passageways formed in the yoke 23 and arranged axially thereof to maintain communication between the ducts 24 and ducts 30 each defined between spiders 28, a rotary shaft 29 and the yoke 23, so that cooling gas can flow therethrough.

31a and 31b designate seal rings of the L-shaped cross-section mounted at axially opposite ends of the yoke 23. The seal rings 31a and 31b are arranged such that they are juxtaposed against inner end portions 13c and 13d of the end covers 13a and 13b respectively, with a small clearance formed therebetween radially of the machine so as to preclude drawing of air by suction from outside into the machine. Preferably, the clearances are minimized in value. They are generally set at about 5 millimeters by taking into consideration the wobbling or elongation of the shaft. 32 designates stator coils, 33, spacers defining the fluid passage ducts 2 in the stator, and 34, coil supports.

The paths of movements of streams of cooling fluid in the electric rotary machine constructed as aforementioned will now be described. Upon the blowers 11 being actuated to vent air from the machine, streams of cooling gas circulate through various parts of the machine as indicated by arrows to effect cooling thereof.

Cooling of the rotor will first be described. Streams of cooling gas each introduced into each duct 30 through a space between opposite end portions of the spiders 28 as shown in FIG. 1 move through the fluid passageways 27 into the ducts 24 between the poles 21, from which the streams of cooling gas move into the pressure chambers 14 and 15 after axially moving through the machine to cool the field coils 22. The streams of cooling gas reaching the pressure chamber 14 cool the coil ends 3 and move through the fluid passage tubes 12a into the exhaust chamber 12 from which the gas is vented to atmosphere from the machine by the blowers 11. The streams of cooling gas reaching the pressure chamber 15 move through the fluid passage openings 16 into the exhaust chamber 12 from which the gas is likewise vented to atmosphere from the machine by the blowers 11.

On the other hand, cooling of the stator is effected by producing streams of cooling gas which move as indicated by arrows in FIG. 2 and FIG. 3 through the multitude of fluid passage ducts 2 formed peripherally by the stator iron cores 1, stator coils 32 and spacers 33. More specifically, streams of cooling gas introduced through the ventilation windows 9 of the housing 6 into the fluid inlet chamber 20 flow therefrom into all the axially arranged fluid passage ducts 2 interposed between the fluid collecting duct walls 17 from the outer side of the stator iron core 1 toward the inner side thereof. From the ducts 2, the cooling gas moves into the space 26 where it moves peripherally of the machine and is divided into several streams which are introduced into the fluid passage ducts 2 covered with the fluid collecting duct walls 17 and move therethrough from the inner side of the machine to the outer side thereof. Thus, the streams of cooling gas enters the fluid collecting chamber 12c from which the cooling gas is vented to atmosphere from the machine through the ventilation windows 9 and an exhaust chamber (not shown but corresponding to the exhaust chamber 12 shown in FIG. 1) by the blowers 11. In this way, the stator iron core 1 and the stator coils 32 built in the stator 1 can be cooled.

The features characteristic of the invention are that the cylindrical member 25 is mounted on the outer periphery of the salient poles 21, that the inner peripheral ends of the end covers 13a and 13b are spaced apart from the corresponding axial ends of the yoke 23 a very small distance so as to seal the machine gastight, and that the streams of cooling gas discharged from the fluid passageways 27 cool the coils of the salient poles 21 and the stator coils 32. By virtue of these features, the volume of cooling gas used for cooling the poles 21 can be increased, so that it is possible to cool the poles satisfactorily. At the same time, the coils of the stator can also be cooled satisfactorily, thereby enabling to increase the output power of the electric machine.

The embodiment shown and described hereinabove is provided with the blower 11 mounted at the outside of the stator. It is to be understood, however, that the provision of the blowers is not essential to the invention, and that the blowers can be done without if the cooling gas can be circulated satisfactorily in the machine by the fluid passageways 27 provided in the yoke 23 and serving as fans.

In the embodiment shown and described hereinabove, cooling of the stator iron cores 1 is effected by streams of cooling gas which move through channels different from the channels through which the streams of cooling gas for the rotor flow. This is because water may be used for cooling the stator or the stator may be cooled independently of other parts of the machine when the machine is of a large capacity. Needless to say, the stator as well as the rotor can be cooled by the cooling gas discharged from the fluid passageway 27 formed in the yoke 23 according to the invention.

As aforementioned, the volume of gas used for cooling the poles can be increased and the stator coils can be cooled satisfactorily even if the gas used for cooling the poles is also used for cooling the stator coils. One may wonder why this is so. To enable this feature to be better understood, the feature will be discussed in detail with reference to FIG. 4 to FIG. 7 in which the movement of gas is shown schematically.

Figure 4:
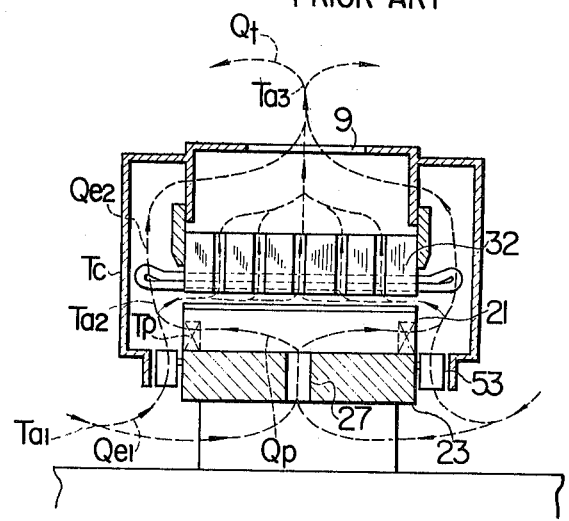
FIG. 4 and FIG. 5 show paths of movements of the streams of cooling gas of the cooling devices of the prior art and according to the invention respectively.
Figure 5:
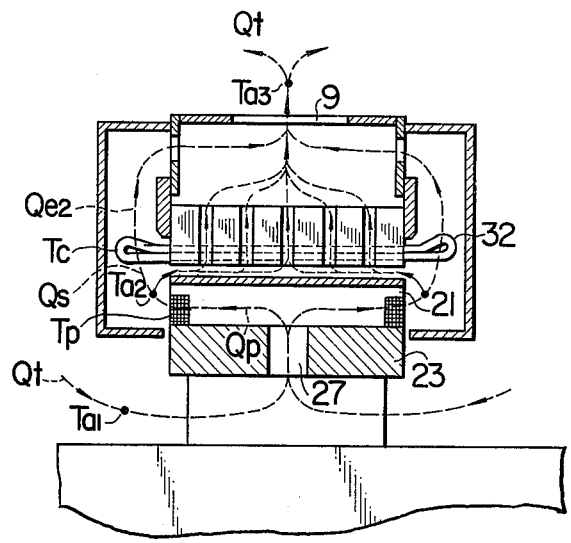

FIG. 4 and FIG. 5 are schematic views of an electric rotary machine of the prior art and the electric rotary machine according to the invention respectively, with arrows indicating the paths of movements of the streams of cooling gas.

In FIG. 4 which shows a conventional electric rotary machine, the coils 32 of the stator are cooled by radially oriented streams of cooling gas produced by radial fans 53 provided in the rotor, the cooling gas being vented out of the machine through the ventilation windows 9 formed in the outer wall of the stator frame.

On the other hand, the poles 21 of the rotor are cooled by the streams of cooling gas as such gas moves axially between the poles. The streams of gas emerging from between the poles are combined with the streams of gas which have cooled the stator coils as aforementioned.

The aforementioned arrangement of the prior art has a disadvantage in that the poles are not cooled satisfactorily. If the volume of gas supplied to the poles is increased in order to increase the degree of efficiency with which the poles are cooled, the volume of gas discharged axially of the machine from between the poles will be increased. When the cooling gas of increased volume discharged from between the poles is combined with the streams of cooling gas radially moving from the fans 53, a turbulent flow of cooling gas will be produced at the point of confluence of the streams of gas, and a noise will be produced. Particularly, the overall volume of gas moving through the stator will be increased, and it will be necessary to provide flow passageways of a larger diameter if the gas of the increased volume is made to flow at a perdetermined speed. As a result, it will become necessary to provide means to obviate this problem by altering the shape of the frame of the stator.

The aforementioned disadvantages of the prior art can be obviated once and for all by the present invention.

More specifically, as shown schematically in FIG. 5, the streams of cooling gas used for cooling the stator and the poles of the rotor move linearly. That is, a large volume of cooling gas discharged from the gas passageway 27 formed in the yoke 23 all moves by the poles and then is directly introduced into the stator to cool the same.

The machine in which the present invention is incorporated is free from noise because there is no confluence of streams of gas of a large volume. Particularly, there is no increase in the overall volume of gas moving through the machine when the cooling device according to the invention is employed. Thus, it is possible to cool the poles satisfactorily without paying any attention to the shape of the frame of the stator.

Attention is drawn to the fact that there is no substantial reduction in the degree of efficiency with which cooling of the stator is effected when the temperature of gas used for cooling the stator is slightly increased as the result of it moving by the poles than when there is no reduction in the temperature of gas. The reason why this is the case will now be explained.

Figure 6:
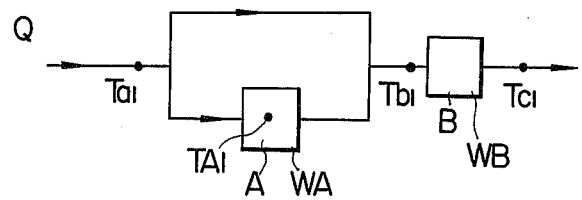
FIG. 6 and FIG. 7 are systematic views showing the movements of cooling gas through a rotary machine.
Figure 7:
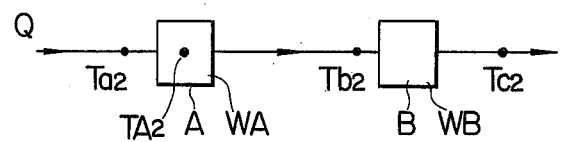

FIG. 6 systematically shows the movements of cooling gas and the members to be coooled thereby (pole coils and stator coils) in a cooling device of the prior art. FIG. 7 is a systematic view of the cooling device according to the invention.

In the figures, Q is the total volume of fluid used for cooling purposes, A the members to be cooled (pole coils), B the members to be cooled (stator coils), $W_A$ the amount of heat (loss) generated in a unit time in the members to be cooled or A in a unit time, and $W_B$ the amount of heat generated in a unit time in the members to be cooled. $Ta1$ and $Ta2$ are the temperatures of the cooling fluid at the inlets, $Tb1$ and $Tb2$ the temperatures of the cooling fluid at the inlets to the members to be cooled or B, $Tc1$ and $Tc2$ are the temperatures of the cooling fluid at the outlets, and $T_{A1}$ and $T_{A2}$ are the temperatures of the members to be cooled or A.

It will now be demonstrated that the temperatures of the members to be cooled A are such that $T_{A1} > T_{A2}$ and that there are not much differences between the temperatures of the members to be cooled or B.

First of all, the temperatures at the inlets to the members to be cooled or B or $Tb1$ and $Tb2$ are equal to each other. That is, when the members to be cooled which produce heat of the amount W in a unit time are exposed to and cooled by a fluid of the total volume Q, a rise $\Delta T$ in the temperature of the cooling fluid can be expressed by the following formula irrespective of the process during which cooling is effected:

$$\Delta T = \frac{W}{Cp \cdot rQ}$$

where $Cp$ is the specific heat and $r$ is the specific weight. Accordingly, when there are no changes in the amount of heat $W$ produced and the volume of fluid $Q$, the following relation will hold:
$$\Delta T = Tb1 - Ta1 = Tb2 - Ta2.$$
Since $Ta1 = Ta2$, then $Tb1 = Tb2$. It will thus be seen that the members to be cooled or B can be cooled with the same degree of efficiency because they are exposed to the cooling gas of the same volume and cooled thereby.

On the other hand, a rise $\Delta T$ in the temperature of the members to be cooled or A (in terms of the temperature of the cooling gas) can be expressed by the following formula:

$$\Delta T = \frac{P}{\alpha \cdot S} \ldots \quad (1)$$

where $S$ is the surface area to be cooled, $Av$ is the sectional area through which the fluid passes, $Q$ is the volume of fluid, $\alpha$ is the co-efficient of heat-transfer, and $vi$ is the speed of movement of the fluid or $Q/Av$.

$\alpha$ can generally be expressed by the following formula:

$$\alpha = Kv^n = K \left( \frac{Q}{Av} \right)^n \ldots \quad (2)$$

where $K$ is the constant. Therefore, $$\Delta T = \frac{P}{K \left( \frac{Q}{Av} \right)^n \cdot S} \ldots \quad (3)$$

$\Delta T$ can be expressed by the following formula in the case of FIG. 6 when the situation is in a state of perfect balance:

$$\Delta T = T_{A1} - \left( \frac{Tb1 - Ta1}{2} \right) \ldots \quad (4)$$

$Q = Q_2 \ P = W_A$ $\Delta T$ can be expressed by the following formula in the case of FIG. 7:

$$\Delta T = T_{A2} \left( \frac{Tb2 - Ta2}{2} \right) \ldots \quad (5)$$

Other values being equal, the following relation can be established from the formulas (3), (4) and (5):

$$\frac{T_{A1} - \left( \frac{Tb1 - Ta1}{2} \right)}{T_{A2} - \left( \frac{Tb1 - Ta1}{2} \right)} = \frac{\frac{W_A}{K \left( \frac{Q_2}{Av} \right)^n \cdot S}}{\frac{W_A}{K \left( \frac{Q}{Av} \right)^n \cdot S}} = \left( \frac{Q}{Q_2} \right)^n \ldots \quad (6)$$

Since $Q > Q2$, and $Tb1 - Ta1 = Tb1 - Ta1$, then $T_{A1} > T_{A2}$. Thus the temperature of the members to be cooled is lower in the case shown in FIG. 7 than in the case shown in FIG. 6.

Experiments were carried out to ascertain to what degree the efficiency can be increased by the device according to the invention. The temperatures were measured in various parts of an electric rotary machine incorporating therein, the cooling device according to the invention and a similar machine of the prior art, and the results were compared with each other. The results obtained are shown in the table shown below.

The table shows the volumes of fluid, the temperatures of the streams of cooling fluid, and the temperatures of the members to be cooled at several points shown in FIG. 4 and FIG. 5. A comparison of the results obtained with the two machines shows the differences between them.

| Items | | Prior Art (FIG. 4) | | The invention (FIG. 5) | |
|---|---|---|---|---|---|
| Volume of Gas in Various Parts | Qt | 12 | m³/s | 12 | m³/s |
| | Qp | 8.4 | " | 12 | " |
| | Qe1 | 3.6 | " | 0 | " |
| | Qe2 | 2.4 | " | 2.4 | " |
| | Qs | 9.6 | " | 9.6 | " |
| Temperature of Gas | Ta1 | 40°C | | 40°C | |
| | Ta2 | 45 | " | 45 | " |
| | Ta3 | 60 | " | 60 | " |
| Coil Temperature | Tp | 105 | " | 98 | " |
| | Tc | 100 | " | 100 | " |

It will be evident in the table that, although there is no difference between the two machines in the temperature of the stator coils, the temperature of the rotor coils of the machine according to the invention which was 98°C was lower than that of the machine of the prior art which was 105°C, in spite of the fact that the total volume of fluid used for cooling was not increased. It may seem that a reduction of 7°C in temperature has no significance. This is not so; it is very difficult to reduce temperature by 1°C when the electric rotary machine is of a large capacity. For example, attempts have hitherto been made to increase the efficiency of cooling by affixing pins to the poles or shifting the conductors of coils so as to increase the surface area exposed to a cooling medium. It is only by 1° to 2°C that the temperature can be reduced as the result of these attempts.

In light of past experiences, a reduction of 7°C in temperature must be said to represent a splendid achievement in increasing the efficiency of cooling. When a machine incorporating the invention therein was placed on a test operation, it has been ascertained that a reduction of 7°C in temperature enables the exciting ampere-turn of the field coils to be increased by about 10% under conditions of the same coils and the same temperature rise. This results in an increase of about 0.1% in the output power of the machine.

It will be evident that the increase of 0.1% in output power is a great merit in the case of an electric rotary machine of large capacity for which the invention is intended, when one takes into consideration the fact that it corresponds to an increase of 1 MW in output power in the case of an electric rotary machine of 1,000 MW.

From the foregoing description, it will be appreciated that the cooling device according to the invention offers the advantage of enabling to increase the degree with which cooling of an electric rotary machine can be effected by causing all of the gas including the gas used for cooling the stator to pass between the poles, without increasing the overall volume of gas used for cooling the machine and without using a complex mechanism. Stated differently, the invention permits the output power of an electric rotary machine to be increased as compared with a similar machine of the same capacity of the prior art or permits to obtain a compact overall size in an electric rotary machine as compared with a similar machine of the same output power of the prior art.

We claim:

1. A cooling device for an electric rotary machine comprising a rotor adapted to rotate together with a rotary shaft, said rotor including a plurality of salient poles affixed to a yoke and having a plurality of radially oriented fluid passageways formed in the yoke and each interposed between the adjacent poles, a stator including coils and cores and mounted around an outer periphery of said rotor with a predetermined clearance interposed between them, and a plurality of end covers each mounted on one of axial opposite ends of said stator in such a manner as to enclose end portions of said coils and each including an inner peripheral portion which is in spaced juxtaposed relationship with respect to one axial opposite ends of the yoke with a very small clearance interposed therebetween.

2. A cooling device for an electric rotary machine comprising a rotor adapted to rotate together with a rotary shaft, said rotor including a plurality of salient poles affixed to a yoke and having a plurality of radially oriented fluid passageways formed in the yoke and each interposed between the adjacent poles, said rotor further including a cylindrical member affixed to an outer periphery of each of said poles, a stator including coils and cores and mounted around an outer periphery of said rotor with a predetermined clearance interposed therebetween, and a plurality of end covers each mounted on one of axial opposite ends of said stator in such a manner as to enclose end portions of said coils and each including an inner peripheral portion which is in spaced juxtaposed relationship with respect to one of axial opposite ends of the yoke with a very small clearance interposed therebetween.

3. A cooling device for an electric rotary machine comprising a rotor adapted to rotate together with a rotary shaft, said rotor including a plurality of salient poles affixed to a yoke and having a plurality of radially oriented fluid passageways formed in the yoke and each interposed between the adjacent poles, said rotor surther including a cylindrical member affixed to an outer periphery of each of said poles, a stator including coils and cores and mounted around an outer periphery of said rotor with a predetermined clearance interposed therebetween, a plurality of end covers each mounted on one of axial opposite ends of said stator in such a manner as to enclose end portions of said coils and each including an inner peripheral portion which is in spaced juxtaposed relationship with respect to one of axial opposite ends of the yoke with a very small clearance interposed therebetween, and a plurality of blowers mounted on an outer periphery of said stator and peripherally spaced apart from one another a predetermined distance to discharge gas from the machine to outside.

4. A cooling device for an electric rotary machine comprising a rotor adapted to rotate together with a rotary shaft, said rotor including a plurality of salient poles affixed to a yoke and having a plurality of radially oriented passageways formed in said yoke, each pair of adjacent poles being separated by a different one of said passageways, said yoke including seal rings mounted at axially opposite ends thereof; a stator including coils and cores, said stator being mounted around the outer periphery of said rotor; and a plurality of end covers, each of said end covers being mounted at axially opposite ends of said stator so as to enclose end portions of said coils in a chamber and each of said end covers including an inner peripheral portion positioned opposite said seal rings so as to form a substantially gastight seal therewith.

5. A cooling device as defined in claim 4, further comprising a cylindrical member affixed at the outer periphery of each of said salient poles of said rotor, the cooling gas which has passed through said plurality of radially oriented passageways formed in said yoke being directed around the ends of said cylindrical member into the chambers formed by said end covers.

6. A cooling device as defined in claim 4, wherein said rotor and said stator are both cooled by the cooling gas which has passed through said plurality of radially oriented passageways.

7. A cooling device as defined in claim 4, further including a plurality of blower means mounted on the outer periphery of said stator for discharging gas from said machine, said blower means being peripherally spaced a predetermined distance apart from one another.

8. A cooling device as defined in claim 4, wherein each said substantially gastight seal precludes the drawing of air into said machine at its respective location.

* * * * *